United States Patent
Hwang et al.

(10) Patent No.: US 10,147,231 B2
(45) Date of Patent: Dec. 4, 2018

(54) SYSTEM AND TERMINAL DEVICE FOR SHARING MOVING VIRTUAL IMAGES AND METHOD THEREOF

(75) Inventors: Yeongmi Hwang, Seoul (KR); Kwang-Joon Lee, Seoul (KR); Hak-Jin Chong, Seoul (KR)

(73) Assignee: KT Corporation, Seongnam (KR)

( * ) Notice: Subject to any disclaimer, the term of this patent is extended or adjusted under 35 U.S.C. 154(b) by 233 days.

(21) Appl. No.: 13/314,395

(22) Filed: Dec. 8, 2011

(65) Prior Publication Data

US 2012/0162207 A1 Jun. 28, 2012

(30) Foreign Application Priority Data

Dec. 23, 2010 (KR) .................. 10-2010-0133961

(51) Int. Cl.
*G06T 19/00* (2011.01)
*H04W 4/02* (2018.01)
*H04L 29/06* (2006.01)

(52) U.S. Cl.
CPC ............ *G06T 19/006* (2013.01); *H04L 67/38* (2013.01); *H04W 4/025* (2013.01); *G06T 2219/024* (2013.01); *G09G 2340/12* (2013.01); *G09G 2340/125* (2013.01)

(58) Field of Classification Search
None
See application file for complete search history.

(56) References Cited

U.S. PATENT DOCUMENTS

| | | | | |
|---|---|---|---|---|
| 6,625,299 B1* | 9/2003 | Meisner | .................... | G01S 5/16 348/169 |
| 8,350,871 B2* | 1/2013 | Gyorfi et al. | ................. | 345/633 |
| 8,355,410 B2* | 1/2013 | Hall | .............................. | 370/432 |
| 8,502,835 B1* | 8/2013 | Meehan | ................ | G06T 19/006 345/633 |
| 2007/0233367 A1* | 10/2007 | Chen | ....................... | G01C 21/00 701/408 |
| 2008/0122871 A1* | 5/2008 | Guday | ................ | G06F 21/6218 345/634 |
| 2010/0023878 A1* | 1/2010 | Douris | ................ | H04L 12/6418 715/757 |
| 2010/0214111 A1* | 8/2010 | Schuler et al. | ............ | 340/686.1 |
| 2010/0279776 A1* | 11/2010 | Hall | ............................... | 463/42 |
| 2010/0287485 A1* | 11/2010 | Bertolami | ............... | G06F 3/011 715/764 |
| 2012/0314936 A1* | 12/2012 | Ishige | ................... | G06T 19/006 382/154 |

FOREIGN PATENT DOCUMENTS

| KR | 100436944 | 6/2004 |
|---|---|---|
| KR | 20070073200 A | 7/2007 |
| KR | 100789100 B1 | 12/2007 |

* cited by examiner

*Primary Examiner* — Kee M Tung
*Assistant Examiner* — Patrick F Valdez
(74) *Attorney, Agent, or Firm* — Sughrue Mion, PLLC

(57) ABSTRACT

Methods and apparatuses for sharing a virtual image. An apparatus includes a virtual image creating unit which creates a moving virtual image, a virtual image registration requesting unit which requests a virtual image sharing server to register the virtual image created by the virtual image creating unit, and a virtual image sharing unit which receives the virtual image having the moving coordinates, which corresponds to current position information of the terminal device, from the virtual image sharing server.

20 Claims, 5 Drawing Sheets

Xt1, Yt1, Zt1                    Xt2, Yt2, Zt2

SYSTEM AND TERMINAL DEVICE FOR SHARING MOVING VIRTUAL IMAGES AND METHOD THEREOF

CROSS-REFERENCE TO RELATED APPLICATIONS

The present application claims priority under 35 U.S.C. § 119(a) from Korean Patent Application No. 10-2010-0133961, filed on Dec. 23, 2010, in the Korean Intellectual Property Office, the disclosure of which is incorporated herein in its entirety by reference.

BACKGROUND

1. Field

Exemplary embodiments relate to a system and terminal device for sharing moving virtual images and a method thereof; and more particularly, to a system and terminal device for generating a moving virtual image using a terminal device (e.g., a mobile terminal) and sharing the generated virtual image with one or more other terminal devices (e.g., movable terminals), and a method thereof.

2. Description of Related Art

Related art mobile augmented reality (AR) service has been limited to processing a virtual image having fixed coordinates on a real image (i.e., current position coordinates). That is, a related art virtual image has fixed coordinates as current position coordinates determined upon creation thereof. Therefore, when a consuming terminal device is near a position of the fixed coordinates, a pertinent virtual image is output to a consuming terminal device.

In this way, the existing mobile augmented service can create a moving image, but the moving image is fixed to a current position determined upon creation thereof, without moving out of the initial position coordinates (the fixed coordinates). That is, the moving image in the existing mobile augmented reality service refers to a "nonstationary" virtual image, not a "moving" virtual image.

Due to limitations that the related art virtual image has fixed coordinates, it has been impossible to provide a service that has mobility through mobile augmented reality.

For example, in the case of a coupon service, a virtual coupon image is fixed to a certain position. Thus, other users could not acquire a moving virtual coupon image using their mobile terminals. In addition, other mobile terminals could not track a virtual coupon image distributed around using a gesture by a mobile terminal. Furthermore, in the case of a game service, a moving virtual character could not be shared or processed using one or more other mobile terminals.

SUMMARY

One or more exemplary embodiments relate to providing a virtual image having moving coordinates.

Another exemplary embodiment relates to a system and a terminal device for creating a moving virtual image having moving coordinates using a terminal device and sharing the created virtual image with one or more other terminal devices, and a method thereof.

Other objects and advantages of the exemplary embodiments can be understood by the following description, and become apparent with reference to the exemplary embodiments. Also, it is obvious to those skilled in the art to which the exemplary embodiments pertain that the objects and advantages of the exemplary embodiments can be realized by the means as claimed and combinations thereof.

According to an aspect of an exemplary embodiment, there is provided a terminal device sharing a virtual image, the terminal device including: a virtual image creating unit configured to create a virtual image; a virtual image registration requesting unit configured to transmit a request to register the virtual image created by the virtual image creating unit; and a virtual image sharing unit configured to receive the virtual image having moving coordinates, which correspond to current position information of the terminal device.

The virtual image creating unit may use a virtual image creating tool to create the moving virtual image on a displayed image using an augmented reality method.

The virtual image creating unit may include a virtual image creator configured to create the virtual image on the displayed image using the augmented reality method; an initial speed unit configured to output an initial speed (V) of the virtual image created by the virtual image creator; an initial direction unit configured to output an initial direction (X, Y, Z coordinates) of the virtual image created by the virtual image creator; and a movement time unit configured to output movement time information (t) of the virtual image created by the virtual image creator.

The virtual image creating unit may further include a movement route unit configured to output movement route of the virtual image created by the virtual image creator.

The virtual image registration requesting unit may map the virtual image created by the virtual image creating unit, movement information of the created virtual image, and current position information of the terminal device, and may request a virtual image sharing server to register the virtual image.

The movement information may include initial speed information, initial direction information, and movement time information, or may include movement route information and movement time information.

The virtual image sharing unit may transmit the current position information of the terminal device to the virtual image sharing server, receive a virtual image having moving coordinates within a certain region from a current position of the terminal device, and share the virtual image.

The virtual image sharing unit may modify or delete the received virtual image, retransmit the virtual image to the virtual image sharing server, receive the modified virtual image from the virtual image sharing server, and share the virtual image.

The virtual image sharing unit may output the virtual image having the moving coordinates on a display unit of the terminal device According to an aspect of another exemplary embodiment, there is provided a virtual image sharing system that includes a virtual image registering unit configured to register a virtual image according to a virtual image registration request from a virtual image registration requesting unit; a moving coordinates calculating unit configured to calculate moving coordinates of the virtual image received from the virtual image registration requesting unit; and a virtual image sharing unit configured to transmit the virtual image to a terminal device based on the moving coordinates calculated by the moving coordinates calculating unit.

The virtual image registering unit may receive the virtual image, movement information and current position information of the virtual image from the virtual image registration requesting unit, and registers the virtual image.

The moving coordinates calculating unit may calculate the moving coordinates of the virtual image, based on the virtual image, the movement information and the current position information of the virtual image received from the virtual image registration requesting unit.

The virtual image sharing unit may transmit the virtual image having moving coordinates within a certain region from current position of the terminal device according to a virtual image request from the terminal device by using the moving coordinates calculated by the moving coordinates calculating unit.

The virtual image sharing unit may transmit a modified virtual image to the plurality of terminal devices and share the virtual image.

The virtual image sharing unit may transmit multi-view virtual images and modified virtual images according to a direction of the terminal device and shares the virtual images.

The virtual image sharing system may further include a virtual image processing unit which reflects modified contents of the virtual images received from the plurality of terminal devices on the corresponding virtual images, and transmit the modified virtual images to the virtual image sharing unit.

According to an aspect of another exemplary embodiment, there is provided a method for sharing virtual images in a terminal device, the method includes: creating a moving virtual image on an actually displayed image; mapping the created moving virtual image, movement information of the created moving virtual image, and current position information of the terminal device, and requesting a virtual image sharing server to register the virtual image; and receiving the virtual image having moving coordinates corresponding to the current position information of the terminal device from the virtual image sharing server.

The method may further include: modifying or deleting the received virtual image; retransmitting the virtual image to the virtual image sharing server; and receiving the modified virtual image from the virtual image sharing server and sharing the virtual image.

The movement information may include initial speed information, initial direction information, and movement time information, or comprises movement route information and movement time information.

According to an aspect of another exemplary embodiment, there is provided a computer-readable recording medium having embodied thereon a computer program for executing the method for sharing virtual images in the terminal device.

According to an aspect of another exemplary embodiment, there is provided a method for sharing virtual images in a virtual image sharing system, the method includes: receiving a virtual image and movement information and current position information of the virtual image, and registering the virtual image; calculating moving coordinates of the virtual image, based on the received virtual image, the movement information and the current position information of the virtual image, and storing the calculated moving coordinates; and transmitting a virtual image within a certain region from current positions of a terminal device based on the calculated moving coordinates.

The method may further include: reflecting modified contents of the virtual images received from the terminal device on the corresponding virtual image; and transmits the modified virtual image to the terminal device and sharing the virtual image.

According to an aspect of another exemplary embodiment, there is provided a computer-readable recording medium having embodied thereon a computer program for executing the method for sharing virtual images in virtual image sharing system.

According to an aspect of another exemplary embodiment, there is provided a terminal device sharing a virtual image, the terminal device includes a virtual image creating unit configured to create a moving virtual image; and a virtual image registration requesting unit configured to transmit a request for registering the virtual image created by the virtual image creating unit. The request may include the created moving virtual image, movement information of the created moving virtual image, and current position information of the terminal device.

According to an aspect of another exemplary embodiment, there is provided a virtual image sharing server, the server includes a virtual image registering unit configured to register a virtual image according to a virtual image registration request; a moving coordinates calculating unit configured to calculate moving coordinates of the received virtual image; and a virtual image sharing unit configured to transmit the virtual image based on the moving coordinates calculated by the moving coordinates calculating unit.

In the above discussed aspects of the exemplary embodiments, the moving virtual image having moving coordinates may be created on the actually displayed image (that is, current position coordinates) using the mobile terminal by an augmented reality method, and the created virtual image having the moving coordinates may be shared by one or more mobile terminals. As such, the created virtual image may be moving with the movement information, such as the initial speed information, the initial direction information, and the movement time information, or the movement information, such as the movement route information and the movement time information. When the movement time is expired, the virtual image may automatically disappear. In addition, the virtual image sharing server may calculate the moving coordinates using the initial speed information, the initial direction information, and the image disappearance time information of the virtual image, or calculates the moving coordinates using the movement route information and the image disappearance time information. Therefore, other mobile terminals as well as the mobile terminal creating the virtual image may track and share the moving virtual image.

BRIEF DESCRIPTION OF THE DRAWINGS

The above and other features and advantages of the exemplary embodiments will become more apparent by describing in detail exemplary embodiments thereof with reference to the attached drawings in which.

DESCRIPTION OF EXEMPLARY EMBODIMENTS

Figure 1:
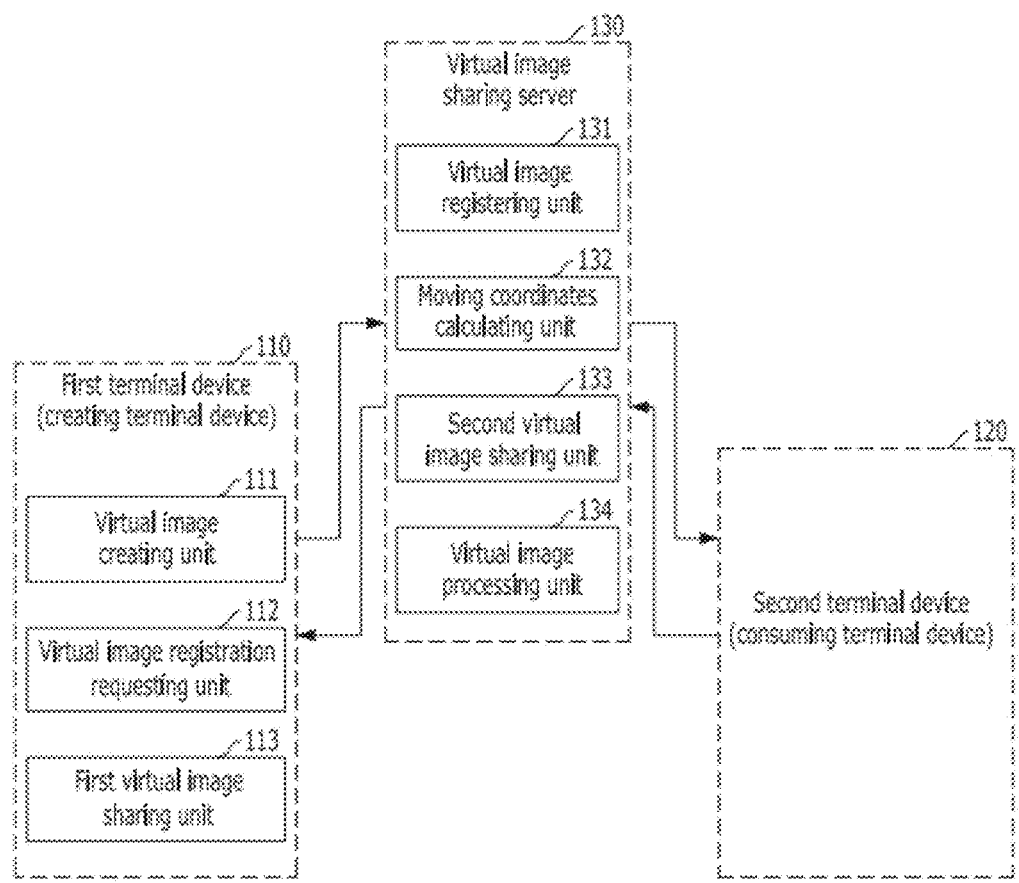
FIG. 1 is a diagram illustrating a terminal device and a system sharing moving virtual images according to an exemplary embodiment.

Exemplary embodiments will be described below in more detail with reference to the accompanying drawings. The following detailed descriptions are provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness. Throughout the disclosure, like reference numerals refer to like parts throughout the various figures and exemplary embodiments.

Throughout the disclosure, when one element (or component) is referred to as being 'connected' to another element (or component), it should be understood that the former can be 'directly connected' to the latter, or 'electrically connected' to the latter through an intervening element (or component). Also, when it is described that one comprises (or includes or has) some elements, it should be understood that it may comprise (or include or have) other elements as well as those elements unless otherwise specified.

According to an exemplary embodiment, a mobile terminal (a creating terminal device) creates moving virtual images on an actually displayed image (that is, current position coordinates) using an augmented reality method. The created virtual image does not have the current position coordinates, which are given upon creation, as fixed coordinates. When creating the virtual image, initial speed information, initial direction information and movement time information of the created virtual image is given as movement information, or movement route information and movement time information is given as movement information. A virtual image sharing server creates the virtual image by calculating the changed position coordinates of the virtual image at each predefined arbitrary time using the initial speed information, the initial direction information, the movement time information, and the movement route information. Therefore, the virtual image has moving coordinates. As a result, when other movable terminal is near a position of the moving coordinates, not the position coordinates given upon creation of the virtual image, a pertinent virtual image is output to the other mobile terminal (a consuming terminal device).

The virtual image having the moving coordinates may be viewed in a plurality of terminal devices. That is, the plurality of terminal devices share the virtual image having the same moving coordinates through the virtual image sharing server. Processing contents of, for example, modifying or deleting the virtual image by each terminal device are commonly reflected to each terminal device through the virtual image sharing server. In addition, the virtual image having moving coordinates can be displayed on each terminal device in various views.

FIG. 1 is a diagram illustrating a terminal device and a system sharing moving virtual images in accordance with an exemplary embodiment.

In FIG. 1, a first terminal device 110 and a second terminal device 120 may perform the same function (for example, a creating function and a consuming function), but their functions will be described below as a first terminal device configured as a creating terminal device, and a second terminal device configured as a consuming terminal device according to an exemplary embodiment.

Referring to FIG. 1, the first terminal device 110 is a terminal device that creates a virtual image. Specifically, the first terminal device 110 creates a virtual image, maps the created virtual image, its movement information, and current position information of the first terminal device, transmits the virtual image to a virtual image sharing server 130, and requests the registration of the virtual image. Also, the first terminal device 110 shares, modifies or deletes the virtual image received from the virtual image sharing server 130. The movement information includes initial speed information, initial direction information, and movement time information, or includes movement route information and movement time information.

As illustrated in FIG. 1, the first terminal device 110 includes a virtual image creating unit 111, a virtual image registration requesting unit 112, and a first virtual image sharing unit 113. The exemplary embodiments of the respective elements of the first terminal device will be described below in detail.

The virtual image creating unit 111 downloads a virtual image creating tool from the virtual image sharing server 130 and creates a moving virtual image. That is, the virtual image creating unit 111 uses the virtual image creating tool downloaded from the virtual image sharing server 130 to create the moving virtual image on an actually displayed image (that is, current position coordinates) using an augmented reality method. The created virtual image is a 2D or 3D virtual image and its current position coordinates are not the fixed coordinates. Although the virtual image creating tool is downloaded from the virtual image sharing server 130, it may also be pre-stored in the first terminal device 110.

The virtual image registration requesting unit 112 maps the virtual image created by the virtual image creating unit 111, the movement information of the created virtual image, and the current position information of the first terminal device 110, and requests the virtual image sharing server 130 to register the virtual image. The current position information of the first terminal device 110 may be acquired from a position information providing apparatus (e.g., GPS module) or may be acquired by direct positioning.

The first virtual image sharing unit 113 transmits the current position information of the first terminal device 110 to the virtual image sharing server 130 and receives and shares a virtual image having moving coordinates corresponding to the current position information of the first terminal device 110. The first virtual image sharing unit 113 may output the virtual image having moving coordinates corresponding to the current position information on a display unit of the first terminal device 110. In addition, the first virtual image sharing unit 113 modifies or deletes the received virtual image, transmits the processed virtual image to the virtual image sharing server 130, and receives and shares the modified virtual image from the virtual image sharing server 130.

Meanwhile, the virtual image sharing server 130 provides the virtual image creating tool to the first terminal device 110, registers the corresponding virtual image according to the virtual image registration request from the first terminal device 110, calculates and stores the moving coordinates (movement route) of the corresponding virtual image, transmits the corresponding virtual image to the first terminal device 110 or the second terminal device 120 using the calculated moving coordinates (movement route) according to the virtual image request from the first terminal device 110 or the second terminal device 120, and shares the virtual image.

As illustrated in FIG. 1, the virtual image sharing server 130 includes a virtual image registering unit 131, a moving coordinates calculating unit 132, and a second virtual image sharing unit 133. The virtual image sharing server 130 further includes a virtual image processing unit 134. The exemplary embodiments of the respective elements of the virtual image sharing server 130 will be described below in detail.

The virtual image registering unit 131 receives the virtual image, the movement information of the virtual image, and the current position information of the first terminal device 110 from the virtual image registration requesting unit 112, and registers the virtual image.

The moving coordinates calculating unit 132 calculates the moving coordinates of the virtual image, based on the virtual image, the movement information of the virtual image, and the current position information of the first terminal device 110, which are received from the virtual image registration requesting unit 112, and stores the moving coordinates of the virtual image at each predefined time (e.g., 1 minute).

The second virtual image sharing unit 133 transmits the corresponding virtual image to the first terminal device 110 or the second terminal device 120 using the calculated moving coordinates according to the virtual image request from the first terminal device 110 or the second terminal device 120. In this manner, the virtual image is shared. At this time, when the current position information and the moving coordinates of the virtual image received from the first terminal device 110 or the second terminal device 120 are within a certain area (e.g., within 100 m), the corresponding virtual image is transmitted to the first terminal device 110 or the second terminal device 120 and is shared. In addition, the modified virtual image is received from the virtual image processing unit 134 and transmitted to the first terminal device 110 or the second terminal device 120, whereby the modified virtual image is shared. The multi-view virtual image and the modified virtual image are transmitted according to the direction of the first terminal device 110 or the second terminal device 120.

The virtual image processing unit 134 provides the virtual image creating tool to the first terminal device 110, and reflects modification contents of the virtual image received from the first terminal 110 or the second terminal device 120 on the corresponding virtual image. The virtual image creating tool supports either or both of 2D or 3D.

Meanwhile, the second terminal device 120 is a terminal that consumes the virtual image. The second terminal device 120 transmits the current position information of the second terminal device 120 to the virtual image sharing server 130 and requests the virtual image. Also, the second terminal device 120 shares the virtual image received from the virtual image sharing server 130 in the above-described manner, and modifies or deletes the virtual image.

Figure 2A:
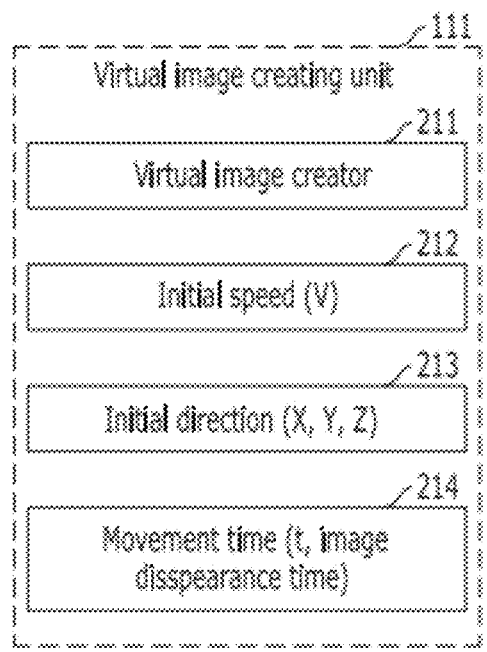
FIG. 2A is a diagram illustrating a virtual image creating unit of FIG. 1 according to an exemplary embodiment.

FIG. 2A is a diagram illustrating the virtual image creating unit 111 of FIG. 1 in accordance with an exemplary embodiment.

Referring to FIG. 2A a virtual image creator 211 uses the virtual image creating tool to create the moving virtual image on an actually displayed image (that is, current position coordinates) using an augmented reality method.

An initial speed unit 212 may output an initial speed V of the virtual image created by the virtual image creator 211. The initial speed unit 212 measures the initial speed measured through a wind strength measuring method, or the user may directly input the initial speed into the initial speed unit 212. That is, the initial speed may be determined through the measurement of the wind strength, or may be input through movement time and destination designation (route designation). The inputting through movement time and destination designation may be automatic or via user input.

An initial direction unit 213 may output an initial direction (X, Y, Z coordinates) of the virtual image created by the virtual image creator 211. The user may directly input the initial direction into the initial direction unit 213. Also, the initial direction unit 213 may calculate the initial direction through a direction measuring method or a route designating method. That is, the initial direction may be input by directly receiving X, Y, Z coordinates from the user, or by calculating X, Y, Z coordinates of the virtual image in a direction of the mobile terminal. Also, the initial direction may be automatically input through destination designation (route designation). The virtual image is moved to a 3D space by inputting the initial direction as the X, Y, Z coordinates of the virtual image.

A movement time unit 214 may output movement time information (t) of the virtual image created by the virtual image creator 211. The user may directly input the movement time information into the movement time unit 214.

Figure 2B:
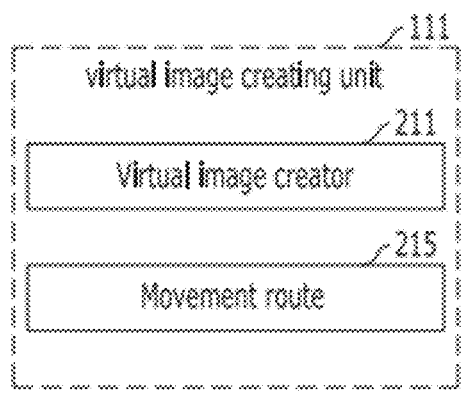
FIG. 2B is a diagram illustrating a virtual image creating unit of FIG. 1 according to another exemplary embodiment.

FIG. 2B is a diagram illustrating the virtual image creating unit 111 of FIG. 1 in accordance with another exemplary embodiment.

As described above with reference to FIG. 2A, the virtual image creator 211 uses the virtual image creating tool to create the moving virtual image on an actually displayed image (that is, current position coordinates) using an augmented reality method.

A movement route unit 215 may output a movement route of the virtual image created by the virtual image creator 211. The movement route may be input through designation of an origin, a mid stopover place, and a destination. The inputting through designation may be automatic or via user input.

Figure 3:
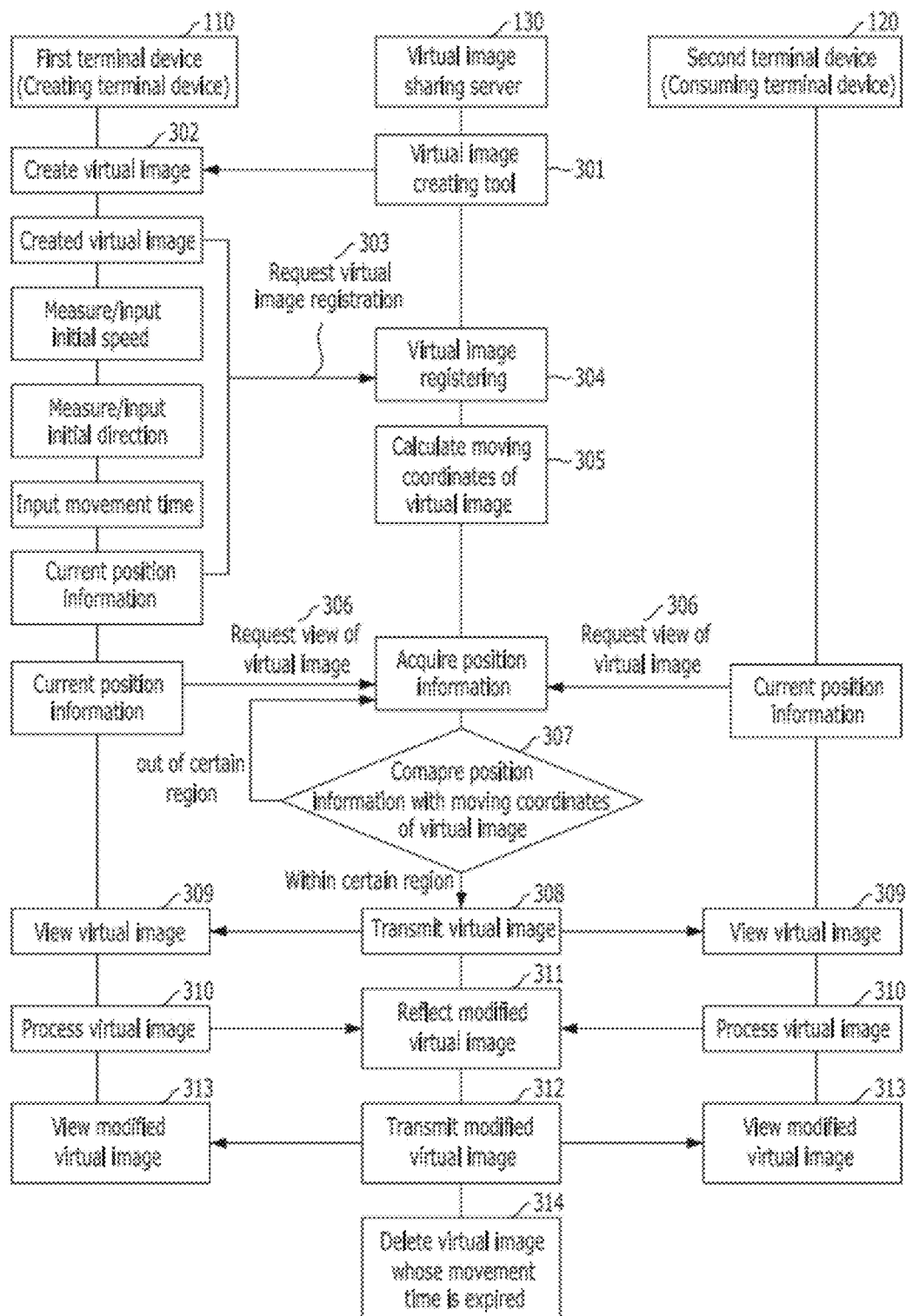
FIG. 3 is a flowchart illustrating a method for sharing moving virtual images according to an exemplary embodiment.
Figure 4:
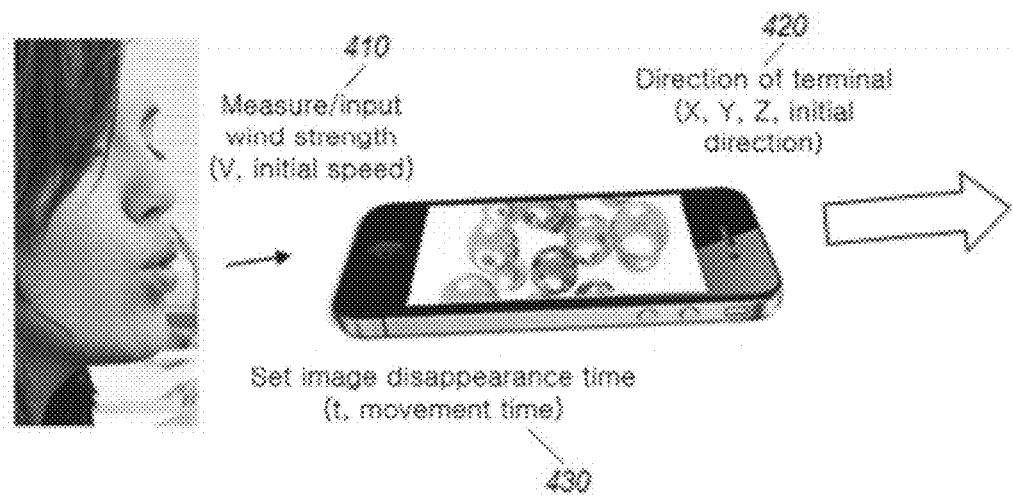
FIG. 4 illustrates an example of an application service (bubbles coupon service).
Figure 4:
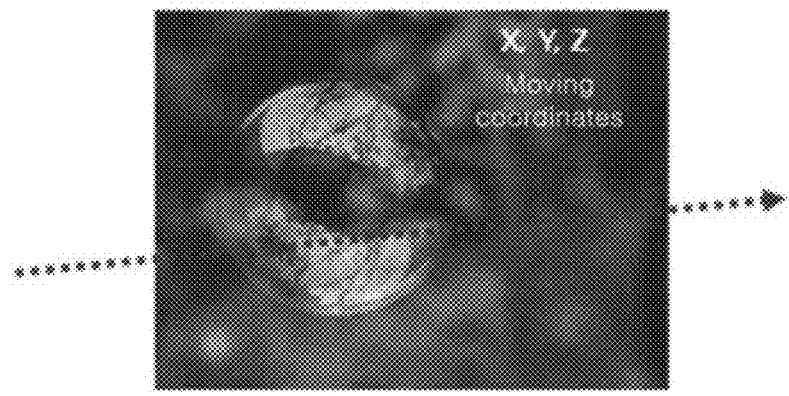
Figure 4:
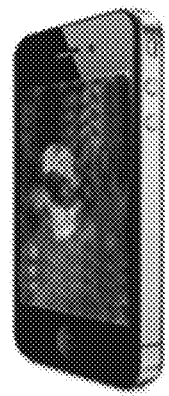
Figure 4:
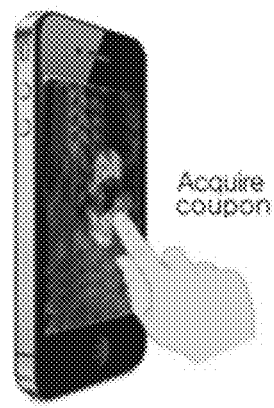
Figure 5:
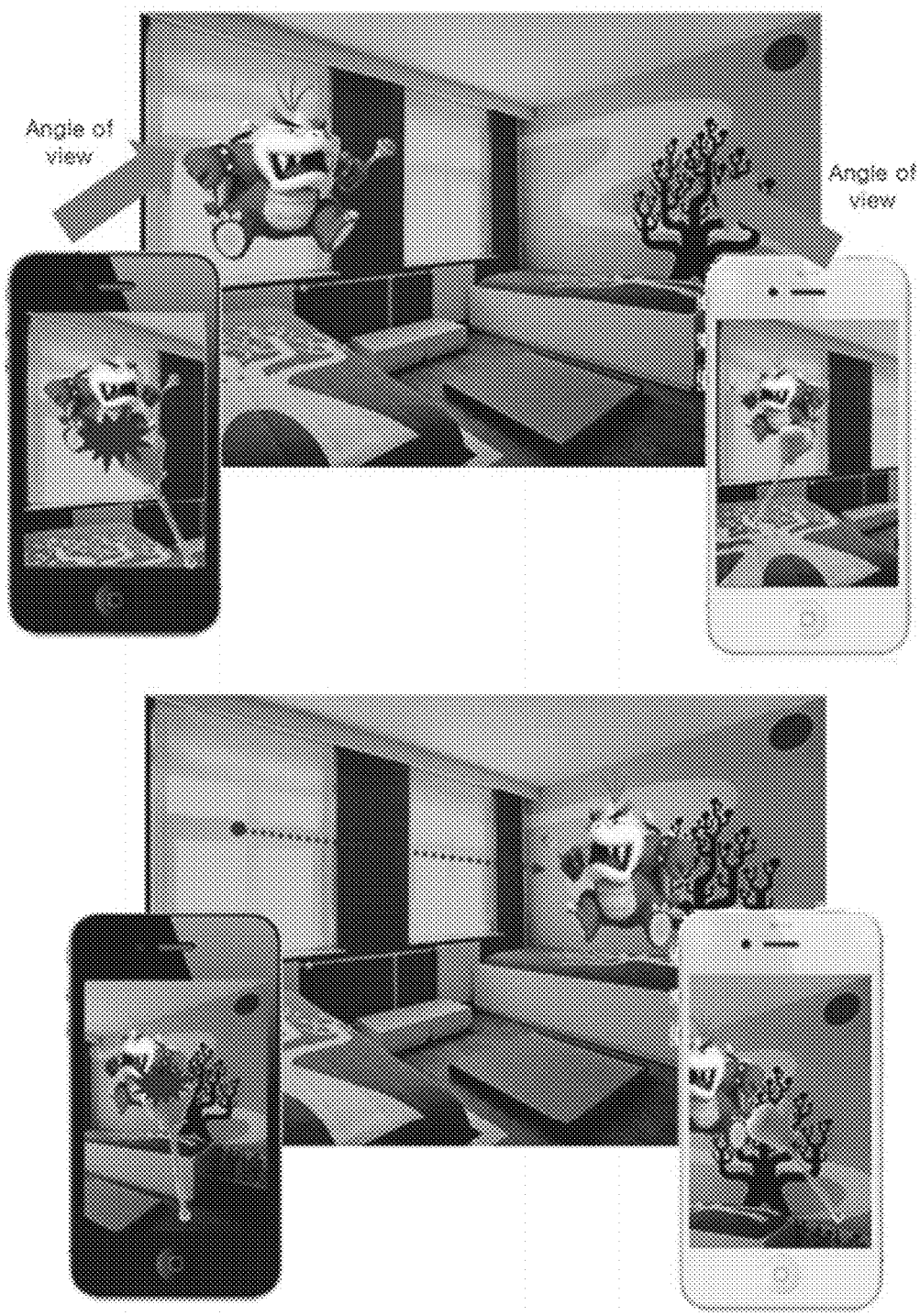
FIG. 5 illustrates another example of an application service (cooperative game service).

FIG. 3 is a flowchart illustrating a method for sharing moving virtual images in accordance with an exemplary embodiment. FIG. 4 illustrates an example of an application service (bubbles coupon service). FIG. 5 illustrates another example of an application service (cooperative game service).

Referring to FIG. 3, at steps S301 and S302, the virtual image creating unit 111 of the first terminal device 110 downloads the virtual image creating tool from the virtual image sharing server 130 and creates the moving virtual image. That is, the virtual image creating unit 111 uses the virtual image creating tool downloaded from the virtual image sharing server 130 to create the moving virtual image on an actually displayed image (that is, current position coordinates) using an augmented reality method. For example, when the first terminal device 110 is executed, the virtual image creating tool capable of creating the virtual image is displayed, and 2D or 3D virtual image creation may be selected.

At step S303, the virtual image registration requesting unit 112 of the first terminal device 110 maps the created virtual image, the movement information of the created virtual image, and the current position information of the first terminal device 110, and requests the virtual image sharing server 130 to register the virtual image. The movement information includes initial speed information, initial direction information, and movement time information, or includes movement route information and movement time information of the created virtual image. For example, in the application service (bubbles coupon service) of FIG. 4, the initial speed 410 may be measured through wind strength measurement, or may be input through movement time and destination designation (route designation). The initial direction 420 may be determined by calculating X, Y, Z coordinates of the virtual image in a direction 0f the mobile terminal, or may be input through destination designation (route designation). The movement time 430 is a disappearance time of the virtual image and may be directly input by the user. Meanwhile, the movement route may be input through the designation of an origin, a mid stopover place, and a destination.

At step S304, the virtual image registering unit 131 of the virtual image sharing server 130 receives the virtual image, the movement information of the virtual image, and the current position information of the first terminal device 110 from the virtual image registration requesting unit 112 and registers the virtual image.

At step S305, the moving coordinates calculating unit 132 of the virtual image sharing server 130 calculates the moving coordinates of the virtual image, based on the virtual image, the movement information of the virtual image, and the current position information of the first terminal device 110, which are received from the virtual image registration requesting unit 112, and stores the moving coordinates of the virtual image at each predefined time (e.g., 1 minute).

At step S306, the first virtual image sharing unit 113 of the first terminal device 110 or the second terminal device 120 transmits the current position information of the first terminal device 110 or the second terminal device 120 to the virtual image sharing server 130, and requests the virtual image.

At step S307 the virtual image sharing server 130 compares the position information with the moving coordinates of the virtual image to determine if the first terminal device 110 or the second terminal device 120 is within a certain range.

At step S308, the second virtual image sharing unit 133 of the virtual image sharing server 130 transmits the corresponding virtual image to the first terminal device 110 or the second terminal device 120 using the calculated moving coordinates according to the virtual image request from the first terminal device 110 or the second terminal device 120, and shares the virtual image. For example, in the application service (cooperative game service) of FIG. 5, the same virtual image can be transmitted to a plurality of terminal devices, and the virtual image can be transmitted to multiviews according to the position and direction of each terminal device.

At step S309, the first virtual image sharing unit 113 of the first terminal device 110 or the second terminal device 120 receives the virtual image having the moving coordinates corresponding to the current position information and shares the virtual image.

At step S310, the first virtual image sharing unit 113 of the first terminal device 110 or the second terminal device 120 modifies or deletes the received virtual image, and reflects the contents modified by the virtual image sharing server 130. At steps S312 and S313, the first virtual image sharing unit 113 retransmits the modified virtual image to the first terminal device 110 or the second terminal device 120 to the first virtual image sharing unit 113 of the first terminal device 110 or the second terminal device 120 and shares the virtual image.

At step S314, the virtual image sharing server 130 deletes the virtual image whose movement time is expired.

In accordance with the exemplary embodiments, the moving virtual image having the moving coordinates can be created using the terminal device (e.g., the mobile terminal), and the created virtual image can be shared by one or more terminal devices (e.g., mobile terminals).

Moreover, since the virtual image having the moving coordinates is shared by one or more terminal devices (e.g., mobile terminals), services having mobility (e.g., mobile augmented reality service) can be provided.

A method of one or more exemplary embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a computer.

The devices of the exemplary embodiments, for example, the first terminal device 110, virtual image sharing server 120, and second terminal device 120, may include a bus coupled to every unit of the device, at least one processor (e.g. central processing unit, microprocessor, etc.) that is connected to the bus for controlling the operation of the device to implement that above-described functions and executing commands, and a memory connected to the bus to store the commands, received messages, and generated messages.

While this specification has been described with respect to the exemplary embodiments, it will be apparent to those skilled in the art that various changes and modifications may be made without departing from the spirit and scope of the features as defined in the following claims.

While this specification contains many features, the features should not be construed as limitations on the scope of the disclosure or of the appended claims. Certain features described in the context of separate exemplary embodiments can also be implemented in combination. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that all exemplary embodiments do not require the distinction of various system components made in this description. The program components and systems may be generally implemented as a single software product or multiple software product packages.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A terminal device sharing a virtual image, comprising:
at least one memory operable to store program code; and
at least one processor operable to read said program code and as instructed by said program code said at least one processor being configured to:

create a virtual image according to services having mobility in terminal devices;

transmit a request according to services having mobility in terminal devices to register the virtual image in a virtual image sharing server; and receive the virtual image in order to share the virtual image in between the terminal devices, wherein the created virtual image is assigned an initial speed information in real space and at least one of an initial direction information in the real space and movement route information in the real space, wherein first position coordinates of the virtual image are calculated based on the initial speed information, a movement time information and the at least one of the initial direction information and the movement route information, wherein the first position coordinates of the virtual image are recalculated and changed at each of a plurality of predetermined intervals based on the initial speed information, the movement time information, and the at least one of the initial direction information and the movement route information, in order to generate a plurality of changed first position coordinates of the virtual image, the plurality of changed first position coordinates being moving coordinates of the virtual image and the plurality of changed first position coordinates represent a path of the virtual image from a first location to a second location in the real space, wherein, second position coordinates of at least one of the terminal devices is compared with one of the plurality of changed first position coordinates of the virtual image, and in response to a determination that a second position corresponding to the second position coordinates of the at least one of the terminal devices is within a predetermined range of the path corresponding to the one of the plurality of changed first position coordinates of the virtual image, the virtual image is output to the at least one of the terminal devices located at the second position, and the virtual image is displayed on the at least one of the terminal devices located at the second position in various views, wherein processing of content of the virtual image by modifying or deleting by each of the terminal devices located at the second position is reflected to the terminal devices located at the second position through the virtual image sharing server, and wherein the first position coordinates and the second position coordinates correspond to a same coordinate system.

2. The terminal device of claim 1, wherein the at least one processor further configured to use a virtual image creating tool to create the virtual image on a displayed image using an augmented reality method according to the services having mobility.

3. The terminal device of claim 2, wherein the at least one processor further configured to:
create the virtual image on the displayed image using the augmented reality method;
output an initial speed (V) of the created virtual image;
output an initial direction (X, Y, Z coordinates) of the created virtual image; and
output movement time information (t) of the created virtual image.

4. The terminal device of claim 2, wherein the at least one processor further configured to:
create the virtual image on the actually displayed image using the augmented reality method; and
output movement route of the created virtual image.

5. The terminal device of claim 1, wherein the at least one processor further configured to map the created virtual image, movement information of the created virtual image, and the current position information of the terminal devices, and request the virtual image sharing server to register the virtual image.

6. The terminal device of claim 5, wherein the movement information comprises the initial speed information, the initial direction information, and the movement time information, or comprises the movement route information and the movement time information.

7. The terminal device of claim 5, wherein the at least one processor further configured to transmit the current position information of the at least one of the terminal devices to the virtual image sharing server, receive a virtual image having moving coordinates within the predetermined range from the second position coordinates of the at least one of the terminal devices, and share the virtual image.

8. The terminal device of claim 7, wherein the at least one processor further configured to modify or delete the received virtual image, retransmit the modified virtual image to the virtual image sharing server, receive the modified virtual image from the virtual image sharing server in order to share the modified virtual image in between the terminal devices.

9. A virtual image sharing system comprising:
at least one memory operable to store program code; and
at least one processor operable to read said program code and as instructed by said program code said at least one processor configured to: register a virtual image based on a virtual image registration request from terminal devices according to services having mobility in the terminal devices;
calculate moving coordinates of the virtual image; and
transmit the virtual image to the terminal devices based on the moving coordinates in order to share the virtual image in between the terminal devices,
wherein the virtual image is assigned an initial speed information in real space and at least one of an initial direction information in the real space and movement route information in the real space,
wherein first position coordinates of the virtual image are calculated based on the initial speed information, a movement time information and the at least one of the initial direction information and the movement route information,
wherein the first position coordinates of the virtual image are recalculated and changed at each of a plurality of predetermined intervals based on the initial speed information, the movement time information, and the at least one of the initial direction information and the movement route information, in order to generate a plurality of changed first position coordinates of the virtual image, the plurality of changed first position coordinates being moving coordinates of the virtual image and the plurality of changed first position coordinates represent a path of the virtual image from a first location to a second location in the real space,
wherein, second position coordinates of at least one of the terminal devices is compared with one of the plurality of changed first position coordinates of the virtual image, and in response to a determination that a second position corresponding to the second position coordinates of the at least one of the terminal devices is within a predetermined range of the path corresponding to the one of the plurality of changed first position coordinates of the virtual image, the virtual image is output to the at least one of the terminal devices located at the second position, and the virtual image is displayed on the at least one of the terminal devices located at the second position in various views, and wherein processing of content of the virtual image by modifying or deleting by each of the terminal devices located at the second position is reflected to the terminal devices located at the second position, wherein the first position coordinates and the second position coordinates correspond to a same coordinate system.

10. The virtual image sharing system of claim 9, wherein the at least one processor further configured to receive the virtual image, movement information and current position information of the virtual image from the terminal devices, and register the virtual image.

11. The virtual image sharing system of claim 10, wherein the at least one processor further is configured to calculate the moving coordinates of the virtual image, based on the virtual image, the movement information, and the current position information.

12. The virtual image sharing system of claim 9, wherein the at least one processor further configured to transmit the virtual image having the moving coordinates within the predetermined range from the second position coordinates of the at least one of the terminal devices according to a virtual image request from the terminal devices by using the moving coordinates of the virtual image.

13. The virtual image sharing system of claim 12, wherein the at least one processor further configured to transmit a modified virtual image to the terminal in order to share the modified virtual image in between the terminal devices.

14. The virtual image sharing system of claim 13, wherein at least one processor further configured to transmit multi-view virtual images and modified virtual images according to a direction of the terminal in order to share the multi-view virtual images and the modified virtual images in between the terminal devices.

15. The virtual image sharing system of claim 13, wherein at least one processor further configured to reflect modified contents of the virtual images received from the terminal devices on corresponding virtual images, and transmit modified virtual images by reflecting the modified contents.

16. A method for sharing virtual images in a terminal device, comprising:
creating, by at least one processor, a virtual image on an actually displayed image according to services having mobility in terminal devices;
mapping, by the at least one processor, the virtual image, movement information of the virtual image, and current position information of the terminal devices, and requesting a virtual image sharing server in order to register the virtual image in the virtual image sharing server; and
receiving, by the at least one processor, the virtual image in order to share the virtual image between the terminal devices,
wherein the created virtual image is assigned an initial speed information in real space and at least one of an initial direction information in the real space and movement route information in the real space,
wherein first position coordinates of the virtual image are calculated based on the initial speed information, a movement time information and the at least one of the initial direction information and the movement route information, wherein the first position coordinates of the virtual image are recalculated and changed at each of a plurality of predetermined intervals based on the initial speed information, the movement time information, and the at least one of the initial direction information and the movement route information, in order to generate a plurality of changed first position coordinates of the virtual image, the plurality of changed first position coordinates being moving coordinates of the virtual image and the plurality of changed first position coordinates represent a path of the virtual image from a first location to a second location in the real space, wherein, second position coordinates of at least one of the terminal devices is compared with one of the plurality of changed first position coordinates of the virtual image, and in response to a determination that a second position corresponding to the second position coordinates of the at least one of the terminal devices is within a predetermined range of the path corresponding to the one of the plurality of changed first position coordinates of the virtual image, the virtual image is output to the at least one of the terminal devices located at the second position, and the virtual image is displayed on the at least one of the terminal devices located at the second position in various views, wherein processing of content of the virtual image by modifying or deleting by each of the terminal devices located at the second position is reflected to the terminal devices located at the second position through the virtual image sharing server, and wherein the first position coordinates and the second position coordinates correspond to a same coordinate system.

17. The method of claim 16, further comprising:
modifying or deleting, by the at least one processor, the virtual image;
retransmitting the modified virtual image to the virtual image sharing server; and
receiving the modified virtual image from the virtual image sharing server in order to share the modified virtual image in between the terminal devices.

18. The method of claim 16, wherein the movement information comprises at least one of the initial speed information, the initial direction information, the movement time information, and the movement route information.

19. A method for sharing virtual images in a virtual image sharing system, comprising:
receiving, by at least one processor, a virtual image and movement information and current position information of the virtual image from terminal devices according to services having mobility in the terminal devices, and registering the virtual image;
calculating, by the at least one processor, moving coordinates of the virtual image, based on the received virtual image, the movement information and the current position information of the virtual image, and storing the calculated moving coordinates; and
transmitting, by the at least one processor, the virtual image within a certain region from current positions of the terminal devices to the terminal devices based on the moving coordinates,
wherein the virtual image is assigned an initial speed information in real space, and at least one of an initial direction information in the real space and movement route information in the real space,
wherein first position coordinates of the virtual image are calculated based on the initial speed information, a movement time information and the at least one of the initial direction information and the movement route information, wherein the first position coordinates of the virtual image are recalculated and changed at each of a plurality of predetermined intervals based on the initial speed information, the movement time information, and the at least one of the initial direction information and the movement route information, in order to generate a plurality of changed first position coordinates of the virtual image, the plurality of changed first position coordinates being moving coordinates of the virtual image and the plurality of changed first position coordinates represent a path of the virtual image from a first location to a second location in the real space, wherein, second position coordinates of at least one of the terminal devices is compared with one of the plurality of changed first position coordinates of the virtual image, and in response to a determination that a second position corresponding to the second position coordinates of the at least one of the terminal devices is within a predetermined range of the path corresponding to the one of the plurality of changed first position coordinates of the virtual image, the virtual image is output to the at least one of the terminal devices located at the second position, and the virtual image is displayed on the at least one of the terminal devices in various views, wherein processing of content of the virtual image by modifying or deleting by each of the terminal devices located at the second position is reflected to the terminal devices located at the second position through the virtual image sharing server, and wherein the first position coordinates and the second position coordinates correspond to a same coordinate system.

20. The method of claim 19, further comprising:

reflecting, by the at least one processor, modified contents of the virtual images received from the terminal device on the corresponding virtual image; and transmitting, by the at least one processor, modified virtual image by reflecting the modified contents to the terminal devices in order to share the modified virtual image in between the terminal devices.

* * * * *